United States Patent [19]

Marquette et al.

[11] 4,009,894
[45] Mar. 1, 1977

[54] FITTING FOR INSULATED DUCT

[75] Inventors: Ralph L. Marquette; James E. Jones, both of Indianapolis, Ind.

[73] Assignee: Mutz Corporation, Indianapolis, Ind.

[22] Filed: Jan. 16, 1976

[21] Appl. No.: 649,789

[52] U.S. Cl. .............................. 285/183; 285/189; 285/424
[51] Int. Cl.² .......................................... F16L 41/00
[58] Field of Search ................... 285/189, 183, 424

[56] References Cited
UNITED STATES PATENTS

| | | | |
|---|---|---|---|
| 2,498,753 | 2/1950 | Deitsch | 285/424 X |
| 2,874,980 | 2/1959 | Browning | 285/183 X |
| 2,950,131 | 8/1960 | Hennen | 285/424 X |
| 2,963,783 | 12/1960 | Field | 285/183 X |
| 2,965,397 | 12/1960 | Vanden Berg | 285/424 X |
| 3,479,073 | 11/1969 | Collins | 285/424 X |
| 3,482,861 | 12/1969 | Keating | 285/424 X |
| 3,727,663 | 4/1973 | McCabe | 285/424 X |

FOREIGN PATENTS OR APPLICATIONS 894,766   4/1962   United Kingdom ............... 285/424

*Primary Examiner*—Thomas F. Callaghan
*Attorney, Agent, or Firm*—Woodard, Weikart, Emhardt & Naughton

[57] ABSTRACT

Disclosed is a fitting having an attachment configuration for end-to-panel securing of the fitting to an insulated duct. The fitting is provided with a standing flange spaced from the end margin of the fitting a distance substantially equal to the thickness of the insulated duct wall adjacent the opening therein and limiting the depth of insertion of the fitting into the opening. An outwardly extending tab or flange is located on one portion of the end margin of the fitting and is adapted to back the adjacent duct wall. A separate member, L-shaped in cross-section, is attached to an opposite portion of the end wall margin after insertion of the fitting, one leg of the L-shaped member backing the adjacent duct wall.

3 Claims, 6 Drawing Figures

FITTING FOR INSULATED DUCT

BACKGROUND OF THE INVENTION

A persistent problem in the use of thermally insulated ducts, that is, ducts formed of relatively thick but somewhat fragile fiber insulation, is the difficulty in attaching fittings to the side panels of the duct. In air distribution systems, for example a main, usually rectangular duct has attached to it, at various places along its length fittings providing branch ducts, direction change elbows, etc. A conventional method of attaching fittings to sheet metal ducts is illustrated in U.S. Pat. Nos. 2,874,980 and 2,963,783. Tabs on the end margin of the fitting are bent back sharply against the interior surface of the sheet metal duct adjacent the duct opening into which the fitting is inserted, the tabs, after bending, serving to lock the fitting to the duct wall. This form of attachment cannot be satisfactorily utilized when the duct is formed of mineral fiber insulation because the somewhat fragile duct wall does not present a sufficiently hard and rigid surface at the fitting margin to permit the fitting tabs to be bent over the duct wall. Tape with an adhesive face has heretofore been used to secure fittings to insulation board panels of ducts, however, this type of joint causes difficulty when humidifiers are installed on the heating plant or when subjected to salt air or other somewhat corrosive atmosphere. The tape, after a time, loses its adhesion, the fitting loosens and leaks develop.

The concept of the present invention provides an economically formed and conveniently applied means for securely attaching a fitting to a side panel of an insulated duct without using adhesive backed tape.

DESCRIPTION OF THE PREFERRED EMBODIMENTS

Figure 1:
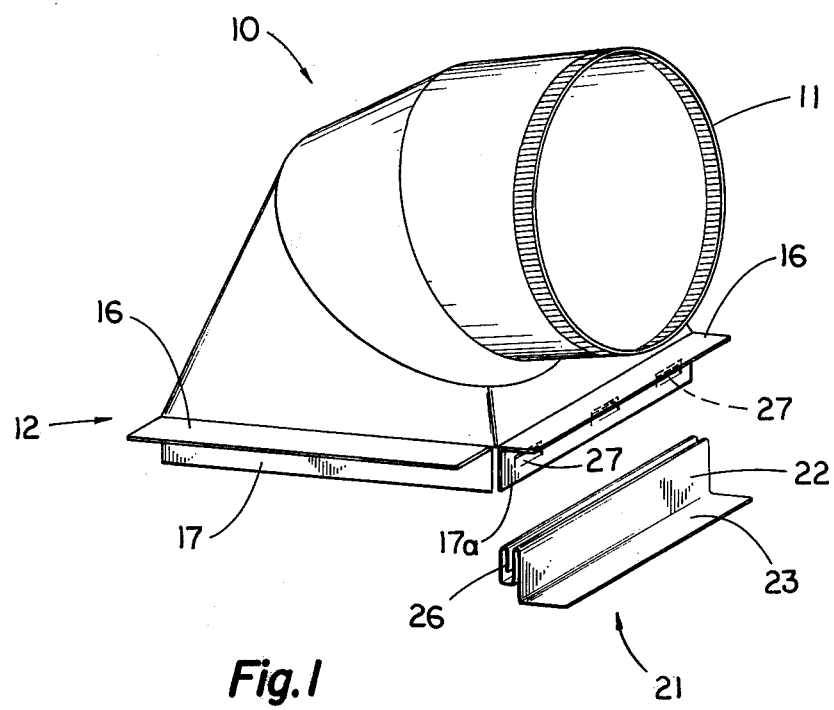
FIG. 1 is a perspective view of a fitting assembly embodying the present invention, the securing member being shown spaced from its assembled or locked position on the tubular body.

Referring initially to FIG. 1 the fitting body 10 may be seen to be a 90° elbow type, its free end 11 being conventionally adapted to be attached to further lengths of round ducts (not shown). Its inner end portion 12 is rectangular in configuration (rectangular herein being used as a broad term including the particular form of rectangle which is a square) and the sheet metal from which the fitting is formed is folded or rolled upon itself to provide an integral, outwardly extending flange 16 which, except for breaks at the corners and along one side, extends around the perimeter of the end portion 12 of the fitting body. The fitting body, along each of its fours sides, extends beyond the flange 16 as indicated at 17 and 17a in FIG. 1 and at 17b in FIGS. 3 and 4. This extending portion, defined or limited by flange 16, is adapted to extend through a suitably sized aperture cut in the duct panel on which the fitting is to be installed, the arrangement being evident in FIG. 5 to be subsequently described.

Figure 4:
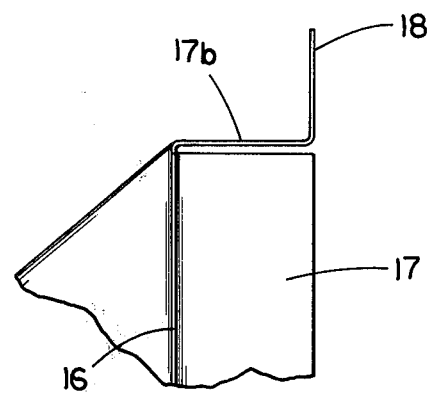
FIG. 4 is a fragmentary side elevation of the structure shown in FIG. 3.
Figure 3:
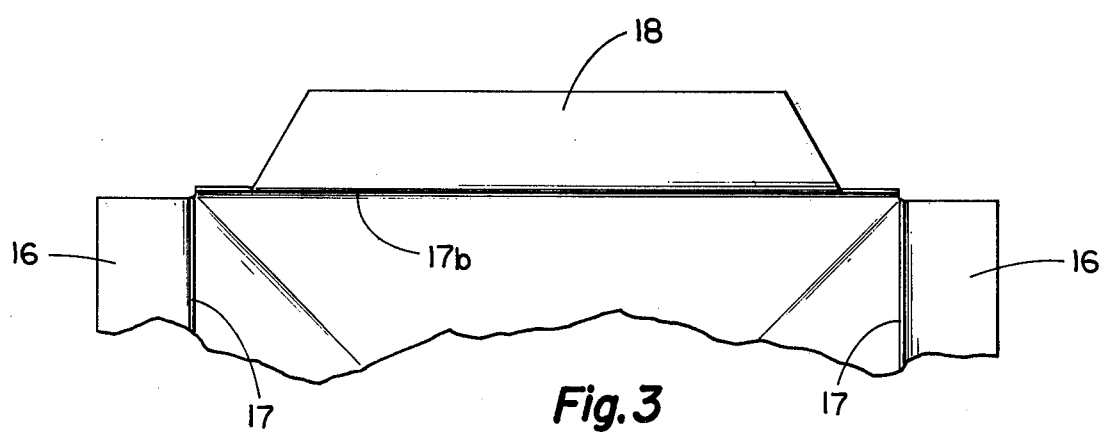
FIG. 3 is a fragmentary, bottom plan view of the tubular body of the fitting.
Figure 5:
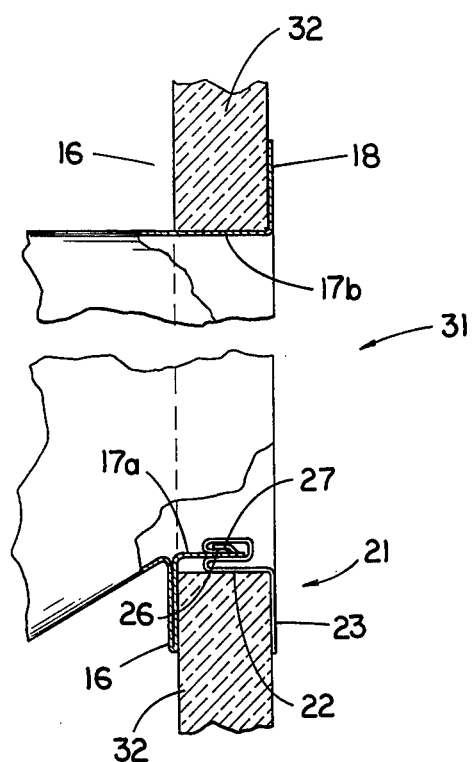
FIG. 5 is an enlarged side sectional view of the fitting assembly installed on an insulated duct panel.

As may best be seen in FIGS. 3 and 4, the inwardly extending portion 17b at the top side of the fitting has no flange 16 and is formed to provide an outwardly extending, integral tab 18 which, as will be evident from FIG. 5, when the fitting is installed, closely overlies the adjacent inner face of the insulated duct panel.

Figure 2:
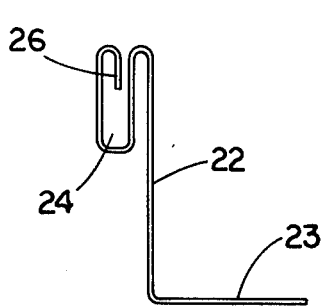
FIG. 2 is a side elevation showing the securing member component of the assembly in profile.

The fastening member 21 (FIGS. 1 and 2) is a further component of the assembly and has a generally L-shaped configuration formed by flanges or legs 22 and 23 (FIG. 2). Leg 22 is bent upon itself to form a flattened S configuration thereby providing a space 24 (FIG. 2) which receives the portion 17a of the fitting body when the assembly is complete. The free tip of the leg portion is reversely bend to form an inwardly directed lip 26 which cooperates with the spaced protrusions 27 (FIG. 1), specifically, inwardly struck tongues, along the length of the portion 17a of the fitting body. As will be evident from FIG. 5, when the member 21 is pushed on the portion 17a to a sufficient depth, the protrusions 27 will engage the free edge of the lip 26 and lock the member in place on the fitting.

To install the fitting a suitably sized aperture 31 (FIG. 5) is cut in the insulated board panel 32. By tilting or cocking the fitting as it is inserted into the aperture, the tab 18 is placed adjacent the inner face of the insulated duct wall 32. By entry of the arm of the installer through the fitting, with the member 21 held in the installer's inserted hand, the member 21 may be pressed on the fitting body so that the space 24 in the member receives the portion 17a and the protrusions 27 cooperating with lip 26, lock the member 21 in assembled position with relation to the fitting body as shown in FIG. 5. The leg 23 of the member 21 then closely overlies the adjacent inner face of the duct wall 32.

The fitting is thus firmly attached and substantially sealed on the duct. No adhesive tape is necessary and no sheet metal parts or tabs are forcibly bent over or against the somewhat fragile insulation board. Insulated ducts, that is, ducts formed from insulating mineral fiber board are well known in the prior art and an improved version of such duct material is disclosed and claimed in our copending U.S. patent application Ser. No. 637,292 filed Dec. 3, 1975 and titled "Duct Board Assembly".

Figure 6:
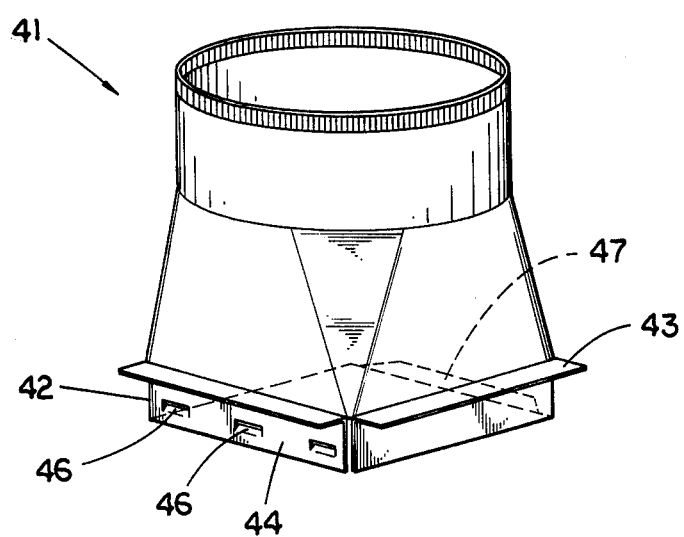
FIG. 6 is a perspective view of a type of fitting body embodying the invention.

FIG. 6 discloses a fitting body 41 having an end portion 42 which is formed identically to the corresponding end portion of the fitting 10. A perimeter flange 43 is formed and the extending portion 44, which receives the member 21 is provided with inwardly struck tongues 46. A tab 47 extends outwardly from one section of the margin of the portion 42. The fitting of FIG. 6 is installed identically to the fitting 10 and illustrates that the attachment concept of the present invention can be utilized on various fitting configurations other than flow direction changing elbows.

While the invention has been disclosed and described in some detail in the drawings and foregoing description, they are to be considered as illustrative and not restrictive in character, as other modifications within the scope of the invention may readily suggest themselves to persons skilled in the art.

We claim:

1. A tubular fitting assembly adapted for end-to-side panel attachment to a duct whose side panels are formed of relatively thick but somewhat fragile thermal insulating material and which has a generally rectangular aperture cut therein to receive the fitting, said assembly comprising a tubular body having a rectangular end portion inserted into the duct aperture, said end portion being defined by a flange extending outwardly around three sides of the rectangular perimeter of the fitting and spaced from the end margin of the fitting by a distance substantially equal to the duct panel thickness adjacent the duct aperture so that said flange bears against the outer face of the duct panel, an integral tab extending outwardly from the end margin of the section of said end portion forming the fourth side of the rectangular perimeter of the fitting so as to closely overlie the adjacent inner face of the duct panel, and a member which is generally L-shaped in cross-section, one of its leg portions being formed to receive and hold a section of the marginal area of the inserted portion of the fitting, said member being manually applied to the fitting margin by access through the tubular fitting after it has been inserted in the duct aperture, and said member being positioned diametrically opposite said tab with the other of its leg portions closely overlying the adjacent inner face of the duct panel to thereby secure the fitting to the panel.

2. A tubular fitting assembly as claimed in claim 1 in which said one leg portion of said member is formed to receive said marginal area of the inserted portion of the fitting by bending said leg portion upon itself to provide a flattened S configuration.

3. A tubular fitting assembly as claimed in claim 2 in which the free marginal portion of said S configurated leg has a rearwardly turned lip and the received section of the marginal area of the fitting is provided with spaced protrusions, said lip and protrusions cooperating to lock said member to the inserted end portion of the fitting.

* * * * *